June 16, 1964  E. H. MOELLER  3,137,043
WIND AND SUN GUARD
Filed June 4, 1962  2 Sheets-Sheet 2
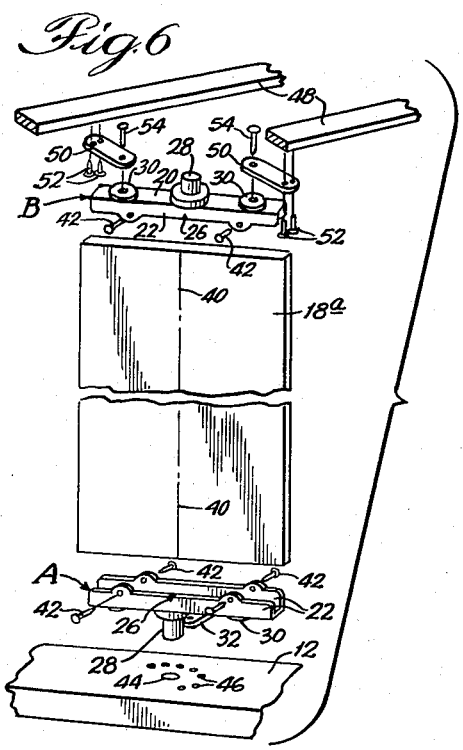
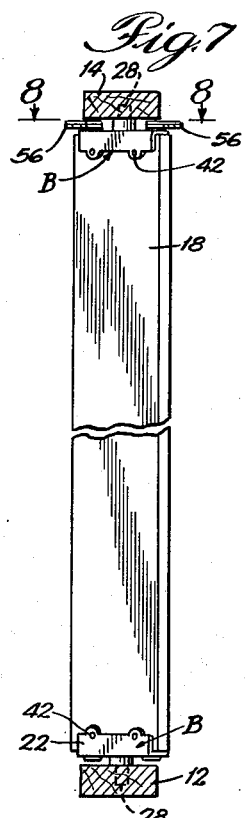
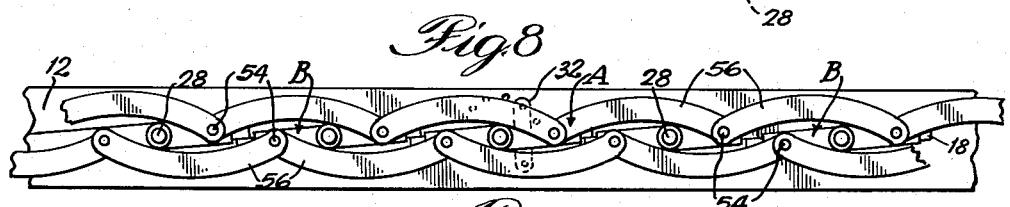
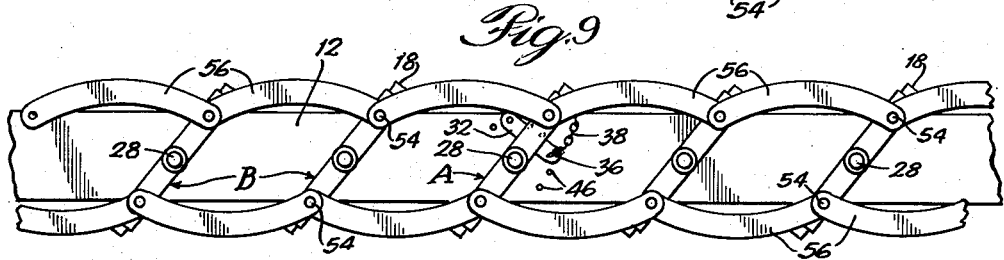
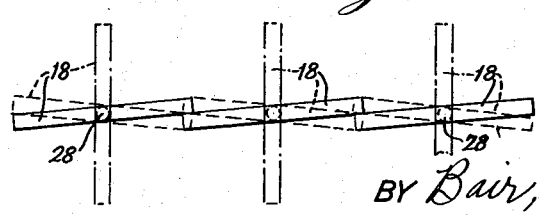
INVENTOR:
Elmer H. Moeller,
BY Bair, Freeman & Molinare
ATTORNEYS.

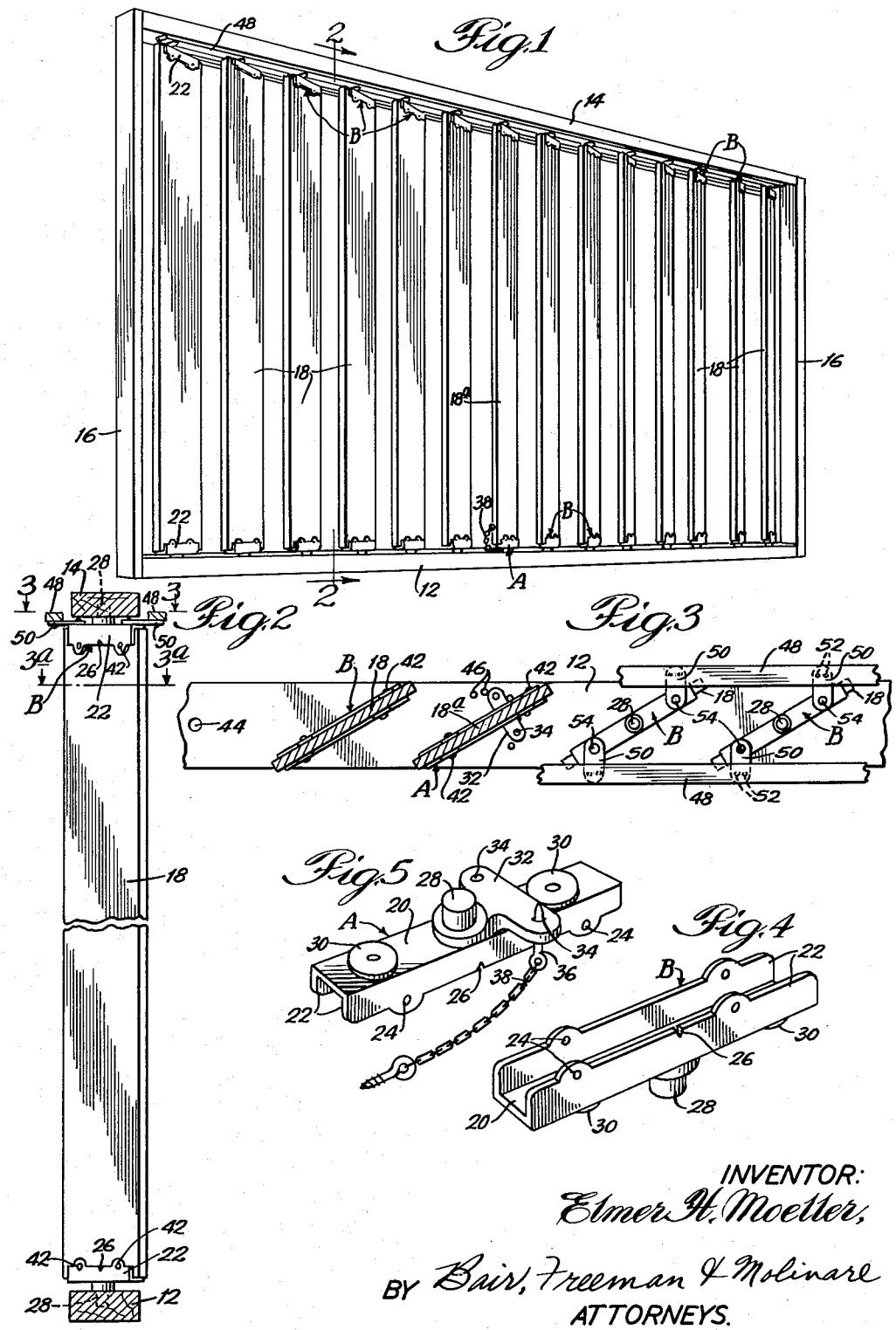

United States Patent Office 3,137,043
Patented June 16, 1964

1

3,137,043
WIND AND SUN GUARD
Elmer H. Moeller, 755 Dawson St., Waterloo, Iowa
Filed June 4, 1962, Ser. No. 199,885
1 Claim. (Cl. 20—62)

This invention relates to a louvered guard to control wind and/or sun with respect to a desired area. For example, the guard may be used to enclose a porch, to side a carport, as a fence, as a patio screen, as a screen for swimming pools or other play areas, or as a vertical or horizontal awning as desired.

One object of the invention is to provide a wind and sun guard which may readily be fabricated from available lumber used to form a rectangular frame and a plurality of slats, the slats being readily assembled into an adjustable louvered structure by securing a plurality of special brackets to the ends of the slats and boring sockets into two opposite members of the frame to receive pintles of the brackets, the brackets being pivotally interconnected for simultaneous rotation and one of them being provided with means for locking the entire louvered assembly in various adjusted positions from a full closed position with the slats overlapping in one direction, through full open to full closed with the slats overlapping in the opposite direction.

Another object is to provide an interconnecting linkage arrangement wherein two links extend longitudinally of the assembly and are operatively connected with the brackets by means of pivot clips.

A further object is to provide a modified construction wherein individual links extend from bracket to bracket for operatively interconnecting the slats for simultaneously adjustment.

Still a further object is to provide brackets, each of which is in the form of a channel between the flanges of which the end of a slat may be positioned and secured by nails or screws, each bracket having a pivot boss for coaction with the link connections of the brackets, and being provided with centering notches to facilitate centering the slat with respect to the bracket when installing the bracket on the slat.

With these and other objects in view, my invention consists in the construction, arrangement and combination of the various parts of my wind and sun guard, whereby the objects above contemplated are attained, as hereinafter more fully set forth, pointed out in my claim and illustrated in detail on the accompanying drawing, wherein:

FIG. 1 is a perspective view of a wind and sun guard embodying my invention, the slats being shown in partially opened position.

FIG. 2 is a vertical sectional view on the line 2—2 of FIG. 1.

FIG. 3 is a plan view with the upper member of the frame removed as taken on the line 3—3 of FIG. 2, the left two slats being shown in section as on the line 3a—3a of FIG. 2.

FIG. 4 is a top perspective view of one of the brackets used for mounting all of the slats with the exception of the lower end of the center slat.

FIG. 5 is a bottom perspective view of a similar bracket which is used on the lower end of the center slat.

FIG. 6 is an exploded perspective view of parts of the guard to show how they are assembled.

FIG. 7 is a vertical sectional view similar to FIG. 2 showing a modified construction.

FIG. 8 is a plan view as on the line 8—8 of FIG. 7 showing the modified construction with the slats in closed position.

FIG. 9 is a similar view showing the slats in open position, and

2

FIG. 10 is a diagrammatic view showing the range of adjustment of the slats of the guard.

On the accompanying drawings I have used the reference numeral 12 to indicate the bottom, 14 to indicate the top and 16 to indicate the ends of a rectangular frame which may be suitably formed of available lumber. The frame 12—14—16 may be made in any size desired.

A plurality of slats 18 of suitable length to fit between the bottom 12 and top 14 of the rectangular frame are provided, and are mounted by means of two brackets B for each slat with the exception of one special control bracket A for the lower end of approximately the center slat 18a of the guard assembly as shown in FIG. 1. The brackets A and B are channel-shaped, having a web 20 and pair of flanges 22 which are perforated as shown at 24 (see FIGS. 4 and 5). The perforations of one flange are offset relative to those of the opposite flange to avoid screw interference. One of the flanges 22 is provided with a centering notch 26. A pintle 28 extends from the back of the web 20 and this web is provided with a pair of pivot bosses 30.

The bracket A differs from the bracket B in that it additionally has a cross-arm 32 provided with a pair of pin-receiving perforations 34 adapted to receive a positioning pin 36 attached by a chain 38 to the slat 18a as shown in FIG. 1.

The centering notches 26 as shown in FIG. 6 are adapted to be matched with a center line 40 drawn on the slats 18 and 18a to facilitate centering the slat with respect to the brackets A and B before nails or screws 42 are inserted through the perforations 24 for securing the brackets to the slats. Pivot sockets 44 are bored into the frame bottom and top 12 and 14 to receive the pintles 28, and are spaced apart appropriately to accommodate the widths of the slats 18 used. Preferably the proportions are somewhat as shown in FIG. 10 so that the slats in the solid line position are closed when they overlap in one direction, wide open when in a centrally adjusted position shown by dot-and-dash lines, or again closed as in the dotted position but overlapping in the opposite direction. As shown in FIG. 6 seven different positions may be provided so that in addition to the three illustrated in FIG. 10 there are two intermediate positions between the solid line position and the dot-and-dash line position and also two intermediate positions between the dot-and-dash line position and the dotted position. FIG. 6 illustrates seven pin sockets 46 bored into the bottom frame member 12 to selectively receive the pin 36 for these various adjusted positions, the two perforations 34 permitting the pin to be inserted from either side of the slat 18a as desired.

For interconnecting the slats 18 and 18a together for simultaneous pivot movement I provide a pair of links 48 as shown in FIG. 6 which may be formed of suitable lumber and provided with a plurality of metal pivot clips 50 secured to the links 48 by nails or screws 52. Each pivot clip 50 is in the proper position to be pivoted as by a pivot screw 54 through one of the pivot bosses 30 of each bracket A and B and into the end of the slat. Thus the slats 18 are connected with the slat 18a for simultaneous movement therewith when the slat 18a is adjusted and locked in adjusted position by the pin 36 through the perforation 34 of the control bracket A and into a desired pin socket 46.

In FIGS. 7, 8 and 9 a modification is shown wherein the two long links 48 which extend the full length of the top member 14 of the rectangular frame are dispensed with, and instead relatively short links 58 extend from slat to slat and are pivoted thereto by the pivot screws 54. FIG. 8 shows the slats in closed position similar to the solid line position shown in FIG. 10, and FIG. 9 shows them in an intermediate position between the full line position and the dot-and-dash line position of FIG. 10. Either the links 48 or the links 56 are effective to keep the slats in parallel alignment.

I have shown my wind and sun guard exclusive of the brackets A and B and the short links 56 made of wood. However, metal, plastics or fiber glass may be used instead. When made of wood, the user can buy the brackets A and B plus materials from a lumber yard and make his own guard, or a contractor or the lumber yard can assemble and sell the complete unit.

While I have shown a complete frame 12—14—16 for mounting the slats 18 and 18a, where installations dictate only the frame members 12 and 14 need be provided as essential to the support of the slats if these two frame members can be properly mounted on some type of existing structure such as the top of the railing and the ceiling of a porch or the like. Also while I have shown the slats vertically mounted the entire assembly may be mounted so that they extend horizontally with the frame members 12 and 14 extending vertically. Alternatively the entire structure may be slanted relative to the vertical or the horizontal to suit certain types of installations, angle of sun and/or other considerations or variants.

Some changes may be made in the construction and arrangement of the parts of my wind and sun guard without departing from the real spirit and purpose of my invention. It is therefore my intention to cover by my claim any modified forms of structure or use of mechanical equivalents which may reasonably be included within its scope.

I claim as my invention:

A slat end bracket for a wind and sun guard comprising a channel-shaped member having a web and a pair of flanges, a pivot pintle projecting from the back of said web and being positioned substantially half way between the ends of said bracket, said flanges having perforations therein for receiving fastening elements to enter a slat received in said bracket, opposite perforations being offset with relation to each other, perforated pivot bosses on the back of said web, and a cross-arm on said web having perforations therein for receiving a locking pin.

References Cited in the file of this patent

UNITED STATES PATENTS

| | | |
|---|---|---|
| 533,045 | Blaine | Jan. 29, 1895 |
| 767,558 | French | Aug. 16, 1904 |
| 799,398 | McMullen | Sept. 12, 1905 |
| 1,582,129 | Cornide | Apr. 27, 1926 |
| 1,888,522 | Ward | Nov. 22, 1932 |
| 2,700,803 | Graham | Feb. 1, 1955 |
| 2,760,242 | Armstrong | Aug. 28, 1956 |
| 2,995,787 | Sarria | Aug. 15, 1961 |

FOREIGN PATENTS

| | | |
|---|---|---|
| 209,945 | Switzerland | June 28, 1939 |